United States Patent

Maezawa

[11] 3,995,949
[45] Dec. 7, 1976

[54] LIQUID CRYSTAL DISPLAY DEVICE OF INCREASED LIFE EXPECTANCY

[75] Inventor: Shuji Maezawa, Suwa, Japan

[73] Assignee: Kabushiki Kaisha Suwa Seikosha, Tokyo, Japan

[22] Filed: July 31, 1974

[21] Appl. No.: 493,351

[30] Foreign Application Priority Data

July 31, 1973 Japan............... 48-86190

[52] U.S. Cl. .................. 350/160 LC; 350/150
[51] Int. Cl.² ............................. G02F 1/13
[58] Field of Search .............. 350/150, 160 LC

[56] References Cited
UNITED STATES PATENTS 3,731,986   5/1973   Fergason ............... 350/150

*Primary Examiner*—Edward S. Bauer
*Attorney, Agent, or Firm*—Blum, Moscovitz, Friedman & Kaplan

[57] ABSTRACT

A liquid crystal display device utilizes birefringent liquid crystals in a twisted mode in combination with a pair of polarizing plates the system being so mounted that the ordinary beam provides the display. The absorption of short-wavelength light is less for the ordinary beam than for the extraordinary beam, resulting in increased life-expectancy of the liquid crystal material, and therefore of the system.

4 Claims, 3 Drawing Figures

LIQUID CRYSTAL DISPLAY DEVICE OF INCREASED LIFE EXPECTANCY

BACKGROUND OF THE INVENTION

Conventionally, to utilize a field-effect liquid crystal display device where the liquid crystals are in the twisted nematic mode, nematic liquid crystals of high positive dielectric anisotropy are utilized. The interior surfaces of the plates constituting the cell which holds the liquid crystal material are each unidirectionally rubbed with a material such as cotton, and the plates are mounted so that the rubbing directions of the opposed plates are at 90° to each other. The molecules immediately adjacent to the inner surfaces of the plates orient themselves in the rubbing directions, and the molecules intermediate the plates form themselves into a helix of one-quarter turn. It is believed that minute grooves are formed by the rubbing and that the liquid crystal molecules fall into the grooves with the molecular axes parallel to the direction of the grooves. Where the rubbing directions, as indicated, are at right angles to each other and the liquid crystal cell is between crossed polarizer plates, then, in the absence of an electric field, light is transmitted through the system. However, if an electric field of sufficient strength is imposed across the cell, utilizing transparent electrodes on the inner surfaces of the cell wall and suitable voltage source connected to said transparent electrodes, then the molecules align themselves with their axes parallel to the imposed field and the optical activity of the liquid crystal material drops to zero. Under such circumstances the crossed polarizing plates prevent any light from passing through the system.

Conventionally, the transparent electrodes do not cover the entire surfaces of the cell plates so that portions of the plates to which the voltage is applied through the use of said electrodes will appear to be dark and opaque while the remainder will be illuminated and transparent. Conversely, if the liquid crystal cell is inserted between polarizers having parallel axes of polarization, that portion of the plates to which the voltage is applied will appear to be illuminated and transparent, and the remainder will be dark and opaque. Generally, the system is mounted so that the polarization axes of the polarizer plates are at 90° to each other, such an arrangement having proved to be the most useful due to the visibility of the display.

Nematic liquid crystals of positive dielectric anisotropy when oriented transverse to the transmission axis of the incident light are birefringent. When the optical axis of the light incident on the liquid crystal layer conforms approximately to the direction of vibration of the incident light, then, in general, the extraordinary beam is the one which is transmitted and used for the display. However, nematic liquid crystals, in general, absorb short-wavelength light so that gradual deterioration and darkening of the liquid crystal material takes place, resulting in decreased visibility of the display provided by the system. It would, therefore, be desirable to eliminate this difficulty.

SUMMARY OF THE INVENTION

A cell is formed of opposing transparent plates, the inner surfaces of each having at least one transparent electrode thereon, each electrode being connectable to an external source of voltage. The interior surface of each of the plates is unidirectionally oriented as by rubbing and the plates are so mounted that the respective rubbing directions are at an angle to each other, preferably at 90° to each other.

Between the plates are nematic liquid crystals. Those liquid crystal molecules immediately adjacent the interior surfaces of said plates orient themselves in the same direction as the orientation of the interior surface of the plate itself. The liquid crystal molecules between the plates form a helix.

The transparent plates of the cell are positioned between a pair of polarizer plates. The polarizer plates are positioned relative to the cell plates so that the transmission axis of each polarizer plate is perpendicular to the orientation of the inner surface of the immediately adjacent cell plate.

The ordering of the liquid crystal molecules in a helix makes the liquid crystal material birefringent. In consequence of the fact that each polarizer plate has its transmission axis perpendicular to the orientation direction of the immediately adjacent cell plate, it is the ordinary beam, rather than the extraordinary beam, which traverses the cell. Experiment has shown that the liquid crystal material absorbs less of the short wave component of the ordinary beam than of the extraordinary beam. Since it is the short-wavelength light which degrades the liquid crystal material, the use of the ordinary beam for the liquid crystal display results in a prolongation of the life of the liquid crystal material and of the device.

Accordingly, an object of the present invention is to prolong the life of the liquid crystal material used in a liquid crystal display device.

A further object to the present invention is a liquid crystal device in which the liquid crystal material is birefringent as well as optically active.

Another object of the present invention is a liquid crystal display device in which the relationship between the transmission axis of a polarizer plate and the orientation of the inner surface of the immediately adjacent cell plate is such that the ordinary beam is transmitted through the cell rather than the extraordinary beam.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWING

For a fuller understanding of the invention, reference is had to the following description taken in connection with the accompanying drawings, in which.

DESCRIPTION OF THE PREFERRED EMBODIMENTS

Figure 2:
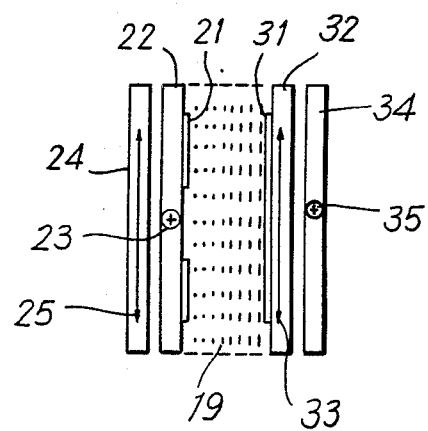
FIG. 2 is an edge view of an embodiment of the present invention.

As is known, rubbing of cell plates unidirectionally produces an oriented surface, generally believed to be due to the formation of minute grooves. When such plates are to be used as the walls of a cell to contain nematic liquid crystals, each plate has one or more transparent electrodes on the surface thereof which is to be the interior surface when the plates are opposed to form a cell. The transparent electrodes are indicated in FIG. 2 by the reference numerals 21 and 31. The rubbing is done subsequent to formation of electrodes 21 and 31 on cell plates 22 and 32 respectively. In forming a cell for containment of liquid crystals indicated by the reference numeral 19, the plates are mounted so that the rubbing directions on the interior surfaces of the two plates 22 and 32 are at an angle to each other. Preferably, the angle is a right angle.

The liquid crystal molecules adjacent the inner surfaces of plates 22 and 32 fall into the minute grooves on the surfaces thereof and, consequently, orient themselves in the rubbing directions, i.e., align themselves with the grooves. Molecules intermediate the plates align themselves at orientations intermediate the rubbing directions of the two plates. In short, the molecules between the two plates orient themselves in the form of a helix. Where the rubbing directions differ by 90°, the liquid crystal molecules form a quarter-turn helix.

Due to the fact that the molecules are ordered, the liquid crystal material becomes birefringent.

Figure 3:
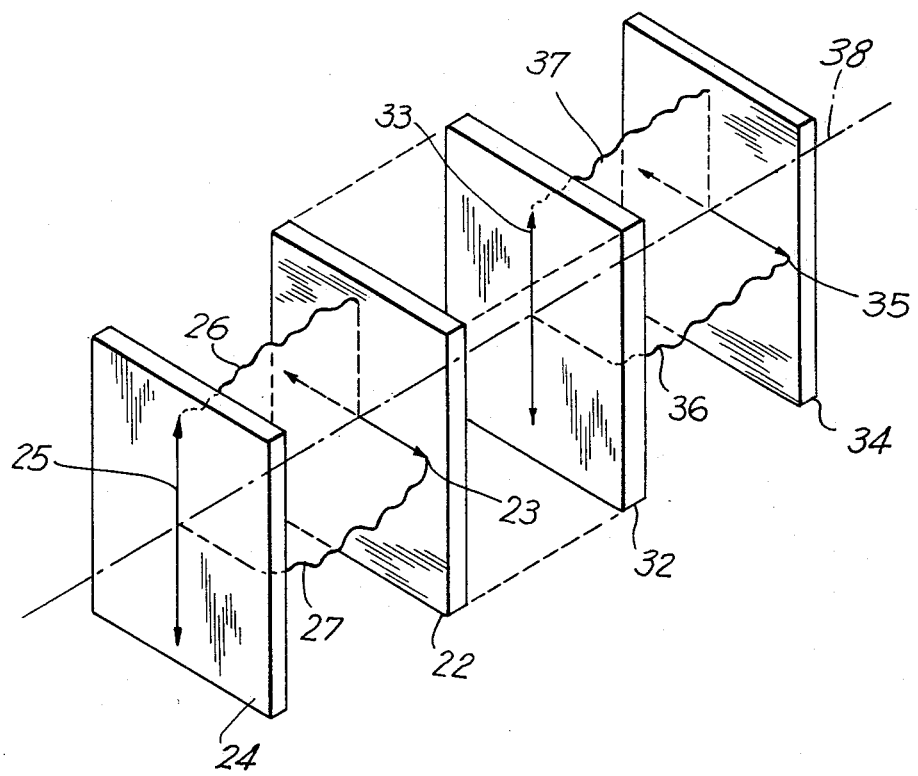
FIG. 3 is an exploded view in perspective of cell plates and polarizer plates arranged in accordance with the present invention.

Taking the case where the rubbing directions of plates 22 and 32 are essentially at right angles to each other as shown in FIG. 3, when the liquid crystal cell is placed between crossed polarizer plates, that portion of the cell plates to which the voltage is applied will appear to be dark and opaque, and the remainder will be eliminated and transparent. However, if the liquid crystal cell is placed between polarizers having their polarization axes parallel to each other, that portion of the plates to which the voltage is applied will appear to be illuminated and transparent, and the remainder will be dark and opaque. Of course, the portion of the plates to which the voltage will be applied is that on which there are transparent electrodes as indicated by reference numerals 21 and 31 in FIG. 2

Looking at FIG.3, it is assumed that incident light arrives at the array of plates from the lower left side. Plane 26 is defined by polarization axis 25 of polarizer plate 24 and optical axis 38 through the system. Plane 27 is defined by rubbing direction 23 on the interior surface of cell plate 22 and the optical axis of the system. If planes 26 and 27 make an angle with each other which is other than 0° or 90° both an extraordinary and an ordinary ray will traverse the cell. However, if planes 26 and 27 are at right angles with each other, then only the ordinary beam will traverse the cell. Similarly, for light approaching the array from the right-hand side, plane 36 is defined by polarization axis 35 of plate 34 and the optical axis of the system and plane 37 is defined by rubbing direction 33 on the interior surface of cell plate 32 and the optical axis of the system. The same conditions apply. If planes 36 and 37 form a right angle, then only the ordinary beam will traverse the cell when light is incident from the right. The same information is presented in FIG. 2 with respect to the relative directions of the polarization axes in the rubbing directions, but, in addition, the fact that the liquid crystal molecules 19 lie in a helix is indicated by the change in apparent length of the molecules in traversing the cell from left to right.

Figure 1:
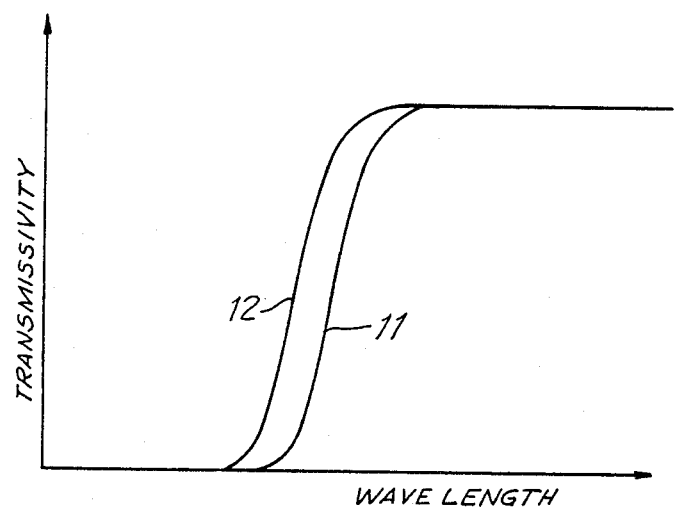
FIG. 1 represents the transmissivity of birefringent liquid crystals as a function of wavelength for the ordinary and for the extraordinary beam.

The advantage in having the ordinary beam traverse the cell rather than the extraordinary beam becomes clear from FIG. 1 where curve 12 shows the transmissivity of the ordinary beam as a function of wavelength and curve 11 shows the transmissivity of the extraordinary beam as a function of wavelength. As can be seen from the Figure, absorption of the extraordinary beam by the liquid crystals starts at a larger wavelength than is the case for the ordinary beam. However, the greater the amount of short-wavelength light absorbed, and the larger the wavelength at which absorption starts, the more rapid is the disintegration of the liquid crystals by light energy. Consequently, conventional liquid crystal display devices which utilize the extraordinary beam have relatively weak light-resistance compared to the liquid crystal display device of the present invention which utilizes only the ordinary beam. Moreover, due to the fact that less light is absorbed, the device in accordance with the present invention is brighter and more readily legible at low levels of illumination. The illumination, of course, is in many cases from the exterior. This is particularly the case where such display devices are used in watches which do not have space available for an interior light source and its associated power source and which may be exposed to short-wavelength light as in daylight for long periods of time.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A field effect system liquid crystal display device using a twisted nematic mode, comprising two opposing transparent base plates, each having at least one transparent electrode on the inner surface thereof, nematic liquid crystals between said base plates, said liquid crystals making contact with said base plates, each of said inner surfaces being unidirectionally oriented and the liquid crystals proximate each inner surface being oriented thereby, a pair of polarizers between which are positioned said base plates, the transmission axis of each polarizer being perpendicular to the orientation of the inner surface of the nearer of said base plates.

2. A field effect system liquid crystal display device as defined in claim 1 wherein the orientations of said base plates are the product of unidirectional rubbing.

3. A field effect system liquid crystal display device as defined in claim 1 wherein said base plates are opposed to each other in such wise that said orientations of said inner surfaces are perpendicular to each other.

4. A field effect system liquid crystal display device as defined in claim 1 wherein said liquid crystals are of positive dielectric anisotropy.

* * * * *